Dec. 6, 1960 H. W. BOTELER 2,963,266
VALVE
Filed July 11, 1957 4 Sheets-Sheet 1

INVENTOR.
HENRY W. BOTELER
BY
*David D. McKenney*
ATTORNEY

INVENTOR.
HENRY W. BOTELER
BY David D. McKenney
ATTORNEY

INVENTOR.
HENRY W. BOTELER

INVENTOR.
HENRY W. BOTELER
ATTORNEY

United States Patent Office 2,963,266
Patented Dec. 6, 1960

2,963,266

VALVE

Henry W. Boteler, East Greenwich, R.I., assignor to Grinnell Corporation, Providence, R.I., a corporation of Delaware Filed July 11, 1957, Ser. No. 671,358

8 Claims. (Cl. 251—331)

This invention relates to improvements in valves of the kind having a substantially straight-through bore or passageway. It is especially useful in diaphragm valves.

Diaphragm valves of this kind are particularly well received by industry because they do not have weirs, pockets or like irregularities at the side of the bore opposite the opening over which the diaphragm is secured. Accordingly the flow through such valves is as uninterrupted as possible and the collection of sediment in crevices is kept at a minimum.

There are, however, a number of disadvantages in the constructions of this kind of diaphragm valve heretofore proposed. For example, because in each such construction there has been substantially no weir, in the closed position of the valve the center portion of the diaphragm has extended substantially all the way to the surface of the straight-through bore opposite the opening around which the diaphragm marginal portion is clamped, and accordingly, the flexible diaphragm portion intermediate these central and marginal portions has had a taper determined by the relative sizes of the passageway and opening. This taper has had to be substantial so that the intermediate flexible diaphragm portion would have room in which to readily form a smooth annular corrugation convexed toward the valve bonnet when the valve was opened and so that this corrugation would not result in too severe a bending of the diaphragm material. At the same time, however, it has been necessary to keep the opening as small as possible so that the area of the diaphragm over which the pressure of the fluid in the bore acts is as small as possible and excessive force is not required to move the diaphragm to closed position. Also, it is desirable to keep the overall dimensions of the valve as small as possible, and the larger the opening, the longer and wider the valve. A taper which is substantial enough to provide long flexure life for the diaphragm can be achieved when the opening is relatively small (though substantially larger than the valve bore) and when the internal surface of the valve body which extends from the opening to the bore is far from parallel to the plane of the clamped diaphragm marginal portion.

One major disadvantage has been that even when sides of the valve have had the substantial taper described above considerable difficulty has been experienced in obtaining a closure. The reason for this is that the seating in each of these prior valves extends across the valve body generally in the form of a band having its central portion substantially coincident with the straight-through passageway, having intermediate portions extending from either side of this central portion along the tapered surface to opposite sides of the opening and having end portions then turning laterally outward a short distance to the clamped diaphragm marginal portion. While the taper in the intermediate portions of this band has been substantial these portions have nevertheless been sufficiently steep to make it extremely difficult to provide a compressor which squeezes the intermediate flexible diaphragm portion against the seating by the same amount both at the intermediate portions thereof which are tapered and at the end portions thereof which extend laterally outward from the opening. In fact, the dimensions of such a compressor which squeezes the intermediate and end diaphragm portions the same amount are so critical that in practice the portions of the compressor overlying these laterally extending seating end portions are actually omitted, and stretching of the intermediate flexible diaphragm portion over the rim of the opening is alone relied upon to hold these diaphragm end portions against the laterally extending seating end portion to achieve a fluid closure.

Such prior constructions have not been entirely successful, particularly in the larger sizes of valves, because leakage had resulted between the diaphragm and the laterally extending end portions of the seating band even when extreme closing force is exerted.

Furthermore even in those valves having compressors with portions overlying the laterally extending seating end portions, there have been inevitable spaces between the clamped marginal diaphragm portion and the diaphragm portions which are engaged by such overlying compressor portions when the valve is closed. This space has been due principally to the relatively large radius which is on the inner edge of the bonnet clamping surface and which is for the purpose of preventing a sharp bend in the diaphragm at this point when the valve is open. These spaces are also due to the clearance required between the edge of the compressor and the interior bonnet surface. Even though these latter spaces are relatively small leakage frequently occurs due to lack of positive compression of the diaphragm material between two rigid members.

In the present invention the above and other defects are overcome by a new configuration of the diaphragm seating which enables the retention of the conventional arrangement for actuating the diaphragm and for clamping the diaphragm marginal portion. This new configuration provides a valve with a straight-through bore in which the internal body surface extending inwardly from the opening to the bore has a taper which, commensurate with good diaphragm flexure life, provides compressor dimensions which are not critical, and provides positive valve closure. At the same time, however, this new configuration avoids pockets or like irregularities in the bore. In one aspect this invention comprehends a novel seating, again in the form of a band with its central portion substantially coincidental with the straight-through bore, but wherein from one end of this portion, at the juncture of the bore and the substantially tapered surface, the band divides into two parts which extend away from each other along the surface and around the two apertures defined by the intersections of the passageway with the surface. Then these two band parts extend back toward each other, still along the surface, to join the other end of said central band portion at the juncture of the bore and the surface. Thus except for the central band portion, the seating is entirely formed on the tapered surface extending inwardly from the opening and no portion of the seating is formed on surfaces extending laterally outwardly beyond such opening.

It is one feature of this arrangement that even with a surface taper which, commensurate with good diaphragm flexure life, provides a compact construction the dimensions of the compressor are not critical. This is because the parts of the intermediate flexible diaphragm portion which are compressed against the tapered seating are all disposed at the same angle (the angle of substantial taper) to the direction of movement of the compressor, and because there is no compressor portion which overlies a laterally extending seating portion. Unlike the prior constructions the omission of such overlying compressor portions in the present invention does not require reliance on stretching of the intermediate flexible diaphragm portion over the rim of the opening to obtain a closing seal in this area. Similarly, in the present invention there is no space along the seating where the diaphragm is not positively squeezed between rigid members during seating.

It is another feature of this arrangement that there are no pockets in the bore opposite the opening, and the seating for the central diaphragm portion is substantially an arcuate bore portion. This diaphragm portion is compressed against the central seating portion at an angle to the direction of movement of the compressor which is everywhere greater than the angle of side wall taper and which is, in fact, 90° at the very center of the diaphragm. Accordingly, this center diaphragm portion is made substantially thicker than the intermediate flexible portion so that the diaphragm material at this location can accommodate the substantial compressor movement required after initial engagement of the diaphragm against the seating to sufficiently squeeze the intermediate flexible diaphragm portion against the tapered portions of the seating to obtain a tight closure.

Another feature is that the seating band may be raised with respect to the tapered surface exending inwardly from the opening whereby the pressure on the part of the intermediate flexible diaphragm sleeve portion which engages the seating is increased.

Another feature of the present invention is that such a raised seating band on the tapered surface is of substantially uniform width.

Other features and advantages of the present invention will become apparent from the following description.

The best mode in which it has been contemplated applying the principles of the present invention are shown in the accompanying drawings but the latter are to be deemed merely illustrative because it is intended that the patent shall cover by suitable expression in the appended claims whatever features of patentable novelty exist in the invention disclosed.

Figure 3:
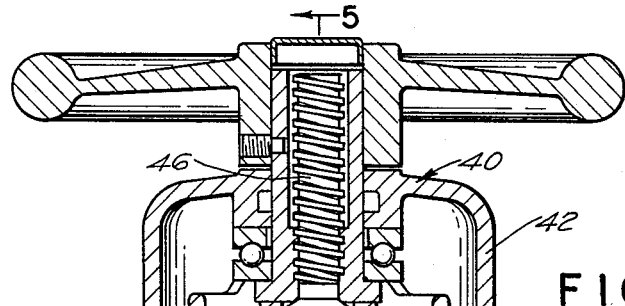
Fig. 3 is a cross-sectioned side elevation view of a complete valve having the body of Fig. 1, the valve being shown in open position.
Figure 3:
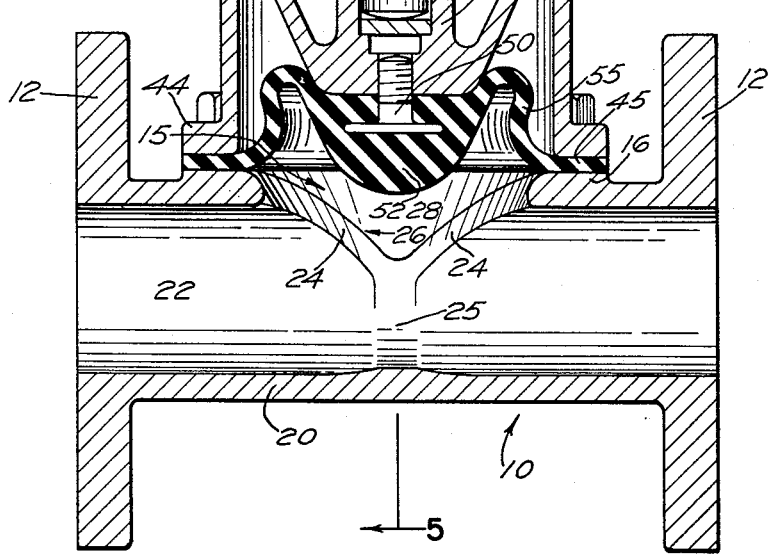
Figure 4:
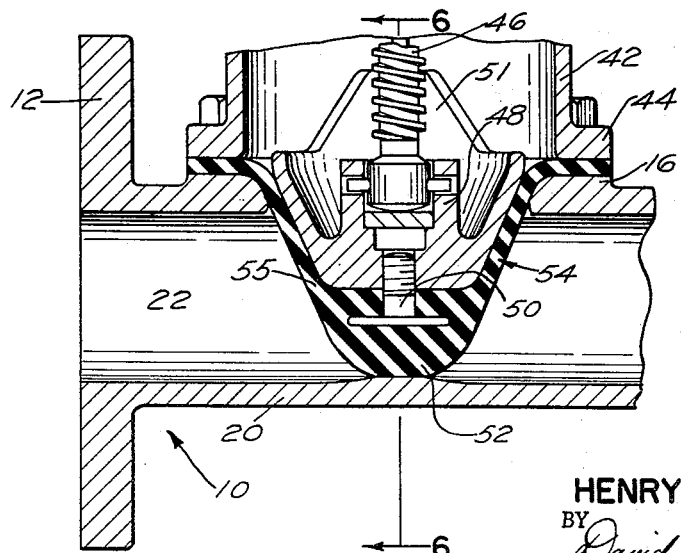
Fig. 4 is a view like Fig. 3 but with the valve shown in closed position.
Figure 5:
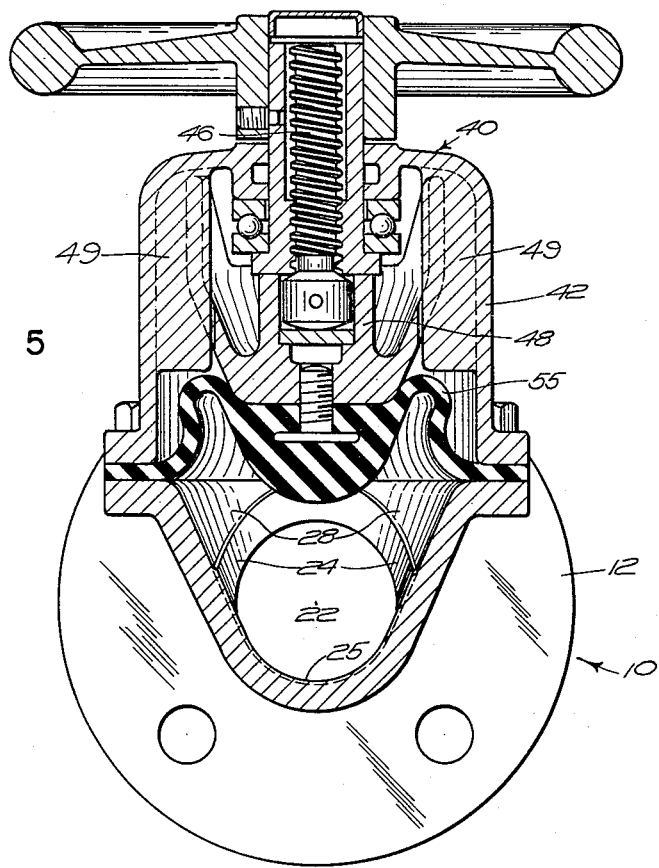
Figure 6:
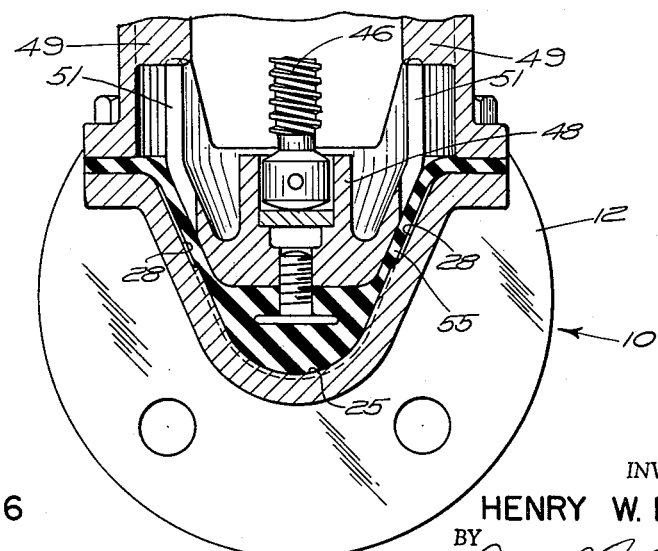
Figure 7:
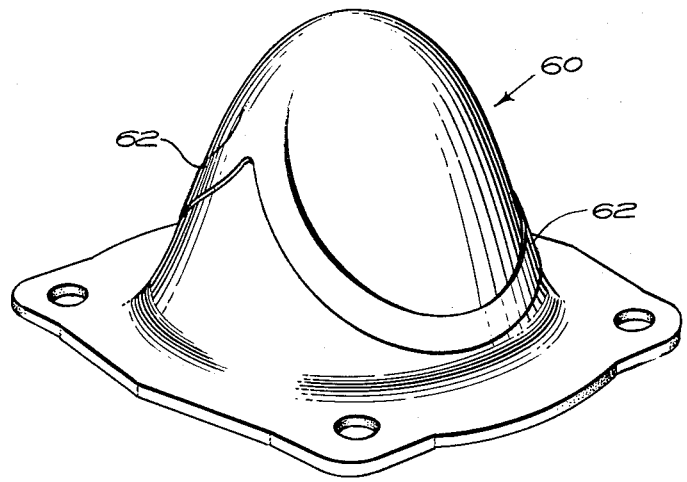
Figure 8:
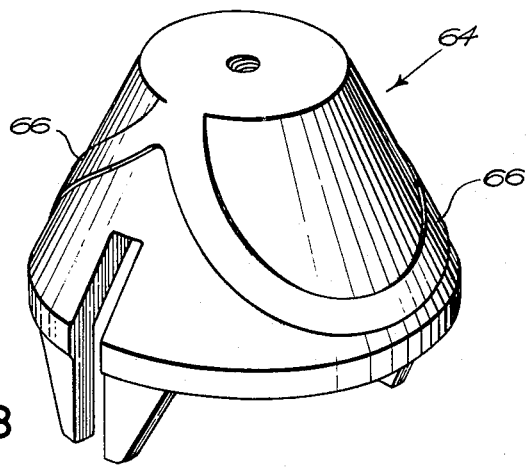

Figs. 5 and 6 are cross-sectioned end views taken on lines 5—5 and 6—6 of Figs. 3 and 4, respectively; and Figs. 7 and 8 are perspective views showing a valve diaphragm and a valve compressor with raised ribs in accordance with the invention.

Referring now more particularly to the drawings, the numeral 10 denotes a generally cylindrical valve body having flanges 12 at both ends. An opening 14 formed in one side of the body is surrouded by a clamping flange 16 and is provided with apertured lugs 18 adapted to receive bolts 19 (see Figs. 3 to 6). The interior surfaces of the walls 20 of the cylindrical valve body define a straight-through flow passageway or bore 22 which intersects a conical chamber 15 defined by the interior surfaces of side walls 28 extending inwardly with substantial taper from the opening to the bore.

Figure 1:
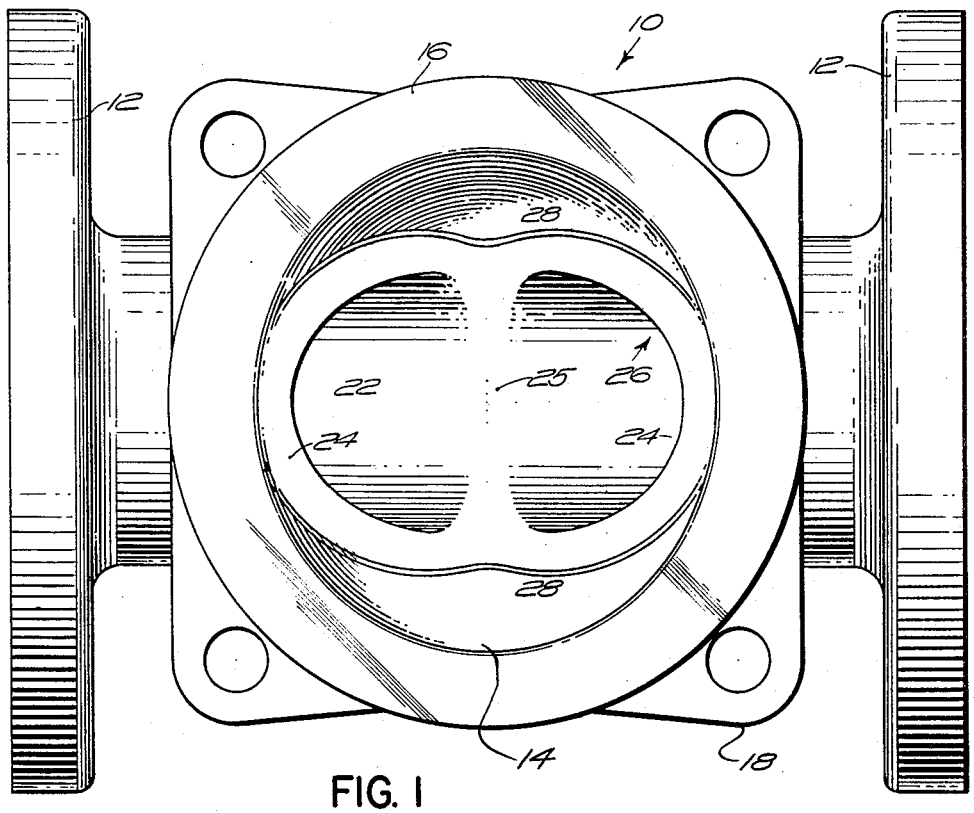
Fig. 1 is a plan view of a diaphragm valve body having a seating in accordance with the present invention.
Figure 2:
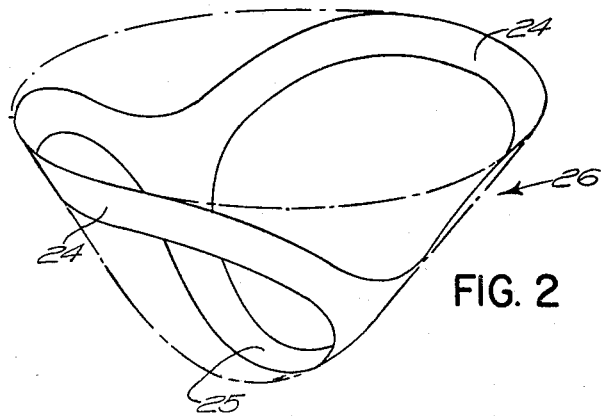
Fig. 2 is a perspective view of the seating surface shown in Fig. 1 illustrating that this surface coincides with the surface of a cone having a substantial taper and having a rounded end which has substantially the same radius as that of the straight-through bore.

The closed, continuous diaphragm seating surface is indicated by the numeral 26 and is best seen in the diagrammatic perspective view of Fig. 2 wherein this surface is shown without the valve body and resembles two closed, edgewise bent bands having a common central cross portion 25 coincident with a bottom portion of the flow bore 22. Each of the remaining portions 24 of the continuous seating surface is disposed around an intersection of the flow passageway 22 with the conical chamber 15. As is seen in Fig. 1, these portions 24 are raised with respect to the interior surfaces of the tapered side walls 28. The diametrically opposed uppermost parts of seating surface portions 24 join and merge into the inner edges of flange 16 against which the diaphragm marginal portion is clamped. This seating surface follows the intersection of a cone with a rounded apex and a cylinder with its axis at right angles to the axis of the cone, the rounded apex of the cone having the same radius as the cylinder and being substantially tangent thereto. Actually the seating surface is formed by a second concentric cone smaller than the first cone by the amount by which the seating surface portions 24 are raised above the surfaces 14.

Reference to Figs. 3 to 6 of the drawings will show how this novel seating cooperates with the other parts of the valve. In these figures, the numeral 40 denotes a conventional actuating mechanism for the valve which includes a bonnet 42 having a lower flange to clamp the marginal portion 45 of a diaphragm 54 against the body flange 16 and also having an actuating spindle 46 secured to a truncated conical compressor 48. A conventional guide 49 and slot 51 are provided for preventing rotation of the compressor within the bonnet element 42. A stud 50 which has an enlarged head embedded in the thickened central portion 52 of a flexible diaphragm 54 has its threaded shank secured to the end of the compressor.

In the closed position of the valve the flexible diaphragm portion 55 intermediate the central and marginal portions seats against surfaces 24 while the central apex portion 52 seats against the surface 25. The compressor element 48 exerts direct compressive force on the diaphragm at all points of contact against the seating surface 26 so that there are no spaces along the seating where the diaphragm is not pressed between two rigid members, and mere stretching of the diaphragm is not relied upon to effect a fluid seal. Because the interior wall 28 of the chamber 15 is recessed with respect to the adjacent seating surface portions 24, the diaphragm is not pressed against this wall 28 with any substantial force if the diaphragm engages this wall.

It will be seen from Fig. 4 that when the valve is closed, the fluid pressure acting on the upstream side of the diaphragm tends to move the compressor and diaphragm to press the other side of the diaphragm against the downstream seating surface of portion 24. Thus the fluid pressure itself is utilized in part to effect a fluid seal.

In practice the taper of the conical chamber 15 should be substantial so as to allow the diaphragm to move from the open position to the closed position without undue bending and creasing of the intermediate flexible diaphragm portion 55. An included cone angle of about 60° has been found satisfactory, although it will be understood that this figure is given by a way of illustration only.

It is not necessary that the two diametrically opposed uppermost parts of the seating surface portions 24 merge with the top surface of flange 16. Such an arrangement tends to keep the overall height of the valve to a minimum but if it is desired the wall surfaces 28 may include portions which extend above the seating surface 26 at all points.

Whereas the portions 24 of the seating are located adjacent the intersection of the wall surface and the bore and join the ends of the first seating section at about the middle of the valve bore, it will be understood that the sections 24 may be located at any convenient place along the wall surface, it being merely necessary that these sections 24 be relatively narrow, that they go completely around the intersection of the wall surface and the bore and that they join the first seating section which extends across the bore.

While the foregoing description has been given with reference to a diaphragm valve in which the fluid in the body is sealed by the diaphragm and prevented from entering into the bonnet, it will be understood that in certain cases where fluid entering the bonnet is not objectionable and particularly where it is desired to keep the closing force small, an opening may be provided in the diaphragm at some point other than at the seating whereby the pressure on both sides of the diaphragm is maintained equal. Further, the portion of the diaphragm which is clamped between the bonnet and the body may be completely separated from the portion of the diaphragm which effects the seating to form what is essentially a plug valve.

It will be understood that although the novel seating configuration of the invention as shown in the drawings is developed by a raised body portion, indicated for example at 24, other arrangements could be employed to obtain a seating of this configuration. For example, a rib of this configuration could be formed on the front or on the back of the diaphragm or on the compressor. Fig. 7 shows a molded closed diaphragm 60 which has formed on its convex surface integral, raised ribs 62 which follow the form of the seating illustrated previously. These ribs 62 provide substantially the same effect on closure as the ribs 27 of Fig. 1 which are integral with the body. Where a diaphragm with ribs 62 is employed ribs 24 on the body may be omitted. However the continuous seating on which the ribs 24 are raised must be retained.

Fig. 8 shows a compressor 64 (similar to compressor 48) which has formed on its surface which engages the concave side of a closed diaphragm integral ribs 66 which again follow the form of the seating previously illustrated.

I claim:

1. A valve for the control of fluids comprising: a body having a substantially straight-through bore of substantially constant cross-section and having a lateral opening from which a wall surface extends to said bore, said wall surface throughout its circumference extending to said bore with substantial taper, a seating in said body comprised of an arcuate first seating section which substantially coincides with the bore at the part of said body opposite said opening and a second seating section which is formed on a portion of said wall surface, said wall surface merging substantially tangentially with said bore on opposite sides of said body, said first seating section extending at least between said points of tangency, said second seating section extending around an intersection of said wall surface by said bore from a portion of said first seating section on one side of said body to the corresponding portion of said first seating section on the opposite side of said body, said second seating section being raised slightly with respect to the remaining portion of said wall surface, and a resilient closure member seating against said seating, said closure member having substantial thickness where it engages said first seating section substantially midway thereon between said points of tangency.

2. A valve for the control of fluids comprising: a body having a substantially straight-through bore of substantially constant cross-section and having a lateral opening from which a wall surface extends to said bore, said wall surface throughout its circumference extending to said bore with substantial taper, a seating in said body comprised of an arcuate first seating section which substantially coincides with the bore at the part of said body opposite said opening and a second seating section which is formed on a portion of said wall surface and which is adjacent an intersection thereof by the bore throughout its length, said wall surface merging substantially tangentially with said bore on opposite sides of said body, said first seating section having at least a portion extending between said points of tangency, said second seating section extending around said intersection from a portion of said first seating section on one side of the body to the corresponding portion of said first seating section on the opposite side of said body, said second seating section being raised slightly with respect to the remaining portion of said wall surface, and a resilient closure member seating against said seating, said closure member having substantial thickness where it engages said first seating section substantially midway thereon between said points of tangency.

3. A valve for the control of fluids comprising: a body having a substantially straight-through bore of substantially constant cross-section and having a lateral opening from which a wall surface extends to said bore, said wall surface throughout its circumference extending to said bore with substantial taper, a seating in said body comprised of a first seating section including a substantially arcuate bore section on the side of said body opposite said opening and a second seating section formed on a portion of said wall surface, said wall surface merging substantially tangentially with said bore on opposite sides of said body, said second seating section extending around an intersection of said wall surface by said bore, from said first seating section on one side of said body to said first seating section on the opposite side of said body, said second seating section being raised slightly with respect to the remaining portion of said wall surface, and a resilient diaphragm disposed across said opening, said diaphragm having its marginal portion clamped against the rim of said opening and having a central portion of substantial thickness which engages the first seating section and having an intermediate portion between said marginal and central portions adapted to flex as the valve is moved from open to closed position.

4. A valve for the control of fluids comprising: a body having a substantially straight-through bore of substantially constant cross-section and having a lateral opening from which a wall surface extends to said bore, said wall surface throughout its circumference extending to said bore with substantial taper, a seating in said body comprised of a first arcuate seating section which substantially coincides with the bore at the side of the body opposite said opening and a second seating section which is formed on a portion of said wall surface and which is adjacent an intersection thereof by the bore throughout its length, said wall surface merging substantially tangentially with said bore on opposite sides of said body, said first seating section having at least a portion extending between said points of tangency, said second seating section extending around said intersection from said first seating section on one side of the body to said first seating section on the opposite side of said body, said second seating section being raised slightly with respect to the remaining portion of said wall surface, and a resilient diaphragm member disposed across said opening, said diaphragm member having a marginal portion clamped against the rim of said opening and having a central portion of substantial thickness which engages the first seating section and having an intermediate flexible portion between said marginal and central portions.

5. A valve for the control of fluids comprising: a body having a substantially straight-through cylindrical bore of substantially constant cross-section and having a lateral circular opening from which a conical wall surface extends to said bore and merges substantially tangentially therewith at points on opposite sides of said body, said wall surface throughout its circumference extending to said bore with substantial taper, a seating in said body comprised of a first seating section which substantially coincides with the bore at the side of the body opposite said opening and a second seating section which is formed on a portion of said wall surface and which is adjacent the intersection thereof by the bore throughout its length, said first seating section having its ends at said points of tangency and extending therebetween, said second seating section extending around said intersection from one end of said first seating section to the other, said second seating section being raised slightly with respect to the remaining portion of said wall surface, and a resilient diaphragm member disposed across said opening, said diaphragm member having a marginal portion clamped against the rim of said opening, having a central portion opposite said first seating section and having an intermediate portion between said marginal and central portions, said central diaphragm portion having substantial thickness which diminishes toward said intermediate portion, and said intermediate diaphragm portion being sufficiently thin to permit flexing which moves the central and intermediate diaphragm portions into and out of closed position against the seating.

6. A valve for the control of fluids comprising: a body having a lateral opening from which a wall surface extends inwardly and having a substantially straight-through bore intersecting said wall surface, said wall surface throughout its circumference extending to said bore with a substantial taper, a compressor element movable in directions substantially perpendicular to the axis of the bore to open and close the valve; means mounting the compressor element over said opening; a resilient sealing element between said compressor and said body, said compressor element forcing the sealing element against a seating area formed on parts of the body to close the valve; said seating area comprising a rib portion on said wall surface extending at least partially around said intersection and also comprising another portion on the bore, said sealing element having corresponding portions which contact said rib portion and said portion on the bore, said seating portions merging smoothly to form a continuous seating area for the sealing element, at least part of the resilient sealing element portion which contacts the rib portion being thin and flexible and at least part of the resilient sealing element which contacts the portion on the bore being several times as thick as said thin flexible portion.

7. A valve for the control of fluids comprising: a body having a lateral opening from which a wall surface extends inwardly and having a substantially straight-through bore of substantially constant cross-section intersecting said wall surface, said wall surface throughout its circumference extending to said bore with substantial taper; a compressor element movable in opposite directions substantially perpendicular to the axis of the bore to open and close the valve; means mounting the compressor element at said opening; a resilient sealing element engaged by the compressor element and forced by movement thereof in one of said directions against a seating on the body formed by body portions to close the valve; a raised rib formed on one side of said sealing element overlying at least a portion of the wall surface which extends around said intersection and which forms a part of the seating, the portions of the sealing element which contact the body portions beneath said rib merging smoothly with any adjacent portions of the sealing element which contact other body portions forming the remainder of the seating to thereby form a continuous seating area, said resilient sealing element being thickened where its direction of travel is substantially normal to the seating.

8. A valve for the control of fluids comprising: a body having a lateral opening from which a wall surface extends inwardly and having a substantially straight-through bore of a substantially constant cross-section intersecting said wall surface, said wall surface throughout its circumference extending to said bore with substantial taper, a compressor element movable in opposite directions substantially perpendicular to the axis of the bore to open and close the valve; means mounting the compressor element at said opening, a resilient sealing element engaged by the compressor and forced by movement thereof against portions of the body which are opposite the lateral opening and form a seating to close the valve; a raised rib formed on the side of the compressor element adjacent the sealing element and overlying at least a portion of the wall surface which extends around said intersection and which forms a part of the seating, the portions of the resilient sealing element which engage body portions beneath said rib merging smoothly with any adjacent portions of the sealing element which engage other body portions forming the remainder of the seating to thereby form a continuous seating area, said resilient sealing element being flexible where it engages said wall surface portion and being substantially less flexible where its direction of travel is substantially normal to the seating.

References Cited in the file of this patent

UNITED STATES PATENTS

| | | |
|---|---|---|
| Re. 19,151 | Saunders | May 1, 1934 |
| Re. 24,350 | Price | Aug. 27, 1957 |
| 2,186,833 | Iler | Jan. 9, 1940 |